(12) United States Patent
Davis et al.

(10) Patent No.: US 11,520,793 B2
(45) Date of Patent: Dec. 6, 2022

(54) SERVICING, DIAGNOSING, LOGGING, AND SURVEYING BUILDING EQUIPMENT ASSETS

(71) Applicant: The Internet of Team, LLC, Hutto, TX (US)

(72) Inventors: Patrick Davis, Hutto, TX (US); Lloyd Oetgen, Carrollton, TX (US)

(73) Assignee: The Internet of Team, LLC, Hutto, TX (US)

( * ) Notice: Subject to any disclaimer, the term of this patent is extended or adjusted under 35 U.S.C. 154(b) by 0 days.

(21) Appl. No.: 16/816,149

(22) Filed: Mar. 11, 2020

(65) Prior Publication Data

US 2020/0293535 A1    Sep. 17, 2020

Related U.S. Application Data

(60) Provisional application No. 62/816,794, filed on Mar. 11, 2019.

(51) Int. Cl.
| | |
|---|---|
| *G06F 16/245* | (2019.01) |
| *G06F 16/2455* | (2019.01) |
| *F24F 11/49* | (2018.01) |
| *G06F 16/2457* | (2019.01) |
| *G06V 10/22* | (2022.01) |

(52) U.S. Cl.
CPC ........ *G06F 16/24564* (2019.01); *F24F 11/49* (2018.01); *G06F 16/24573* (2019.01); *G06V 10/225* (2022.01)

(58) Field of Classification Search
None
See application file for complete search history.

(56) References Cited

U.S. PATENT DOCUMENTS

| | | | |
|---|---|---|---|
| 2007/0157639 A1* | 7/2007 | Harrod | G06F 16/24564 |
| 2010/0138701 A1* | 6/2010 | Costantino | G06F 16/24573 |
| 2010/0306117 A1* | 12/2010 | Terayoko | G06F 16/25 |
| 2013/0245965 A1* | 9/2013 | Kane | G06F 16/2358 |
| 2015/0379785 A1* | 12/2015 | Brown, Jr. | G06F 16/245 |
| 2016/0103457 A1* | 4/2016 | Maughan | G06F 16/48 |
| 2016/0162772 A1* | 6/2016 | Curtis | G06F 16/24564 |
| 2016/0300119 A1* | 10/2016 | Silva | G06F 16/2228 |
| 2017/0059199 A1* | 3/2017 | Zhang | G06F 16/24573 |
| 2017/0343227 A1* | 11/2017 | Mowris | G06F 16/24573 |
| 2018/0031256 A1* | 2/2018 | Gillette | G06F 16/83 |
| 2018/0031266 A1* | 2/2018 | Atchison | G06F 16/24573 |
| 2018/0096309 A1* | 4/2018 | Moses | G06F 16/24 |
| 2018/0096539 A1* | 4/2018 | Merg | G06F 16/24564 |
| 2019/0057466 A1* | 2/2019 | Udell | G06F 16/245 |
| 2019/0368763 A1* | 12/2019 | Noor | G06F 16/24 |

(Continued)

*Primary Examiner* — Son T Hoang

(74) *Attorney, Agent, or Firm* — C. Tumey Law Group PLLC

(57) ABSTRACT

An asset inventory for a site location is conducted by providing a user with a mobile interface, collecting a site ID, collecting an equipment ID, collecting equipment asset information, associating the equipment ID and equipment asset information with the site ID, and storing the equipment asset information, equipment ID, and site ID in one or more data repositories. Site surveys are conducted based on a system comprising a server, one or more data repositories, a mobile data interface, a network, and a series of rules corresponding to service and maintenance of site equipment.

20 Claims, 18 Drawing Sheets

(56) References Cited

U.S. PATENT DOCUMENTS

2020/0133257 A1\* 4/2020 Cella ..................... G06F 16/24
2020/0134573 A1\* 4/2020 Vickers .................. G06F 16/29
2020/0209822 A1\* 7/2020 Gottschalk ............ G06F 16/288
2021/0074417 A1\* 3/2021 Pierson ............. G06F 16/24573

\* cited by examiner

FIG. 9

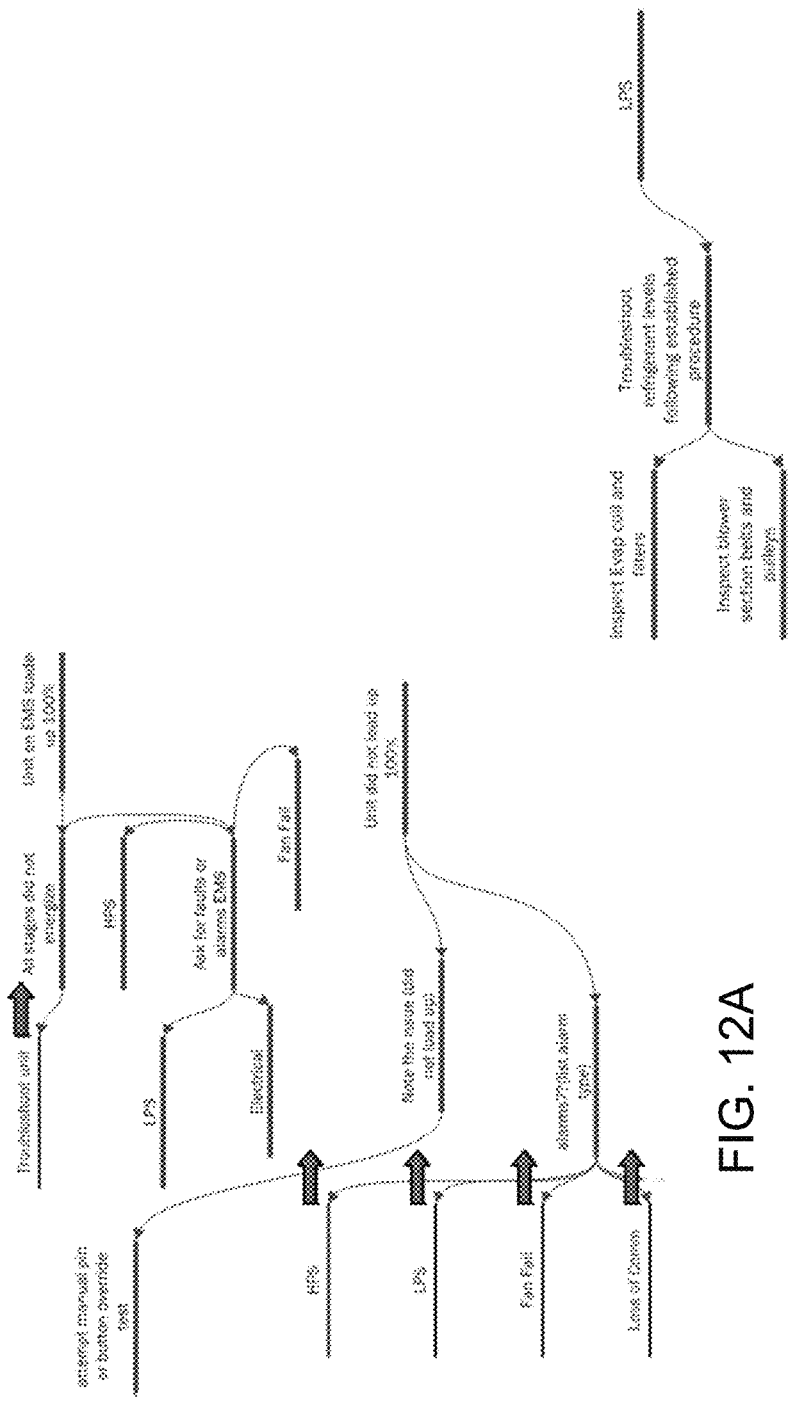

FIG. 13

General Information

Building_ID: xxx-99999
Work_Order_Number: nnn
Auditor: xxxx@xxxx.com

Diagnostics Summary

| | |
|---|---|
| AHU-02 | Unable To Reach 100% Cooling To Perform Diagnostics. |
| AHU-02 | Space Sensor Not Reading Within Tolerance. |
| ch-1 | Space Sensor Not Reading Within Tolerance. |
| SSAHU1 | Unable To Reach 100% Cooling To Perform Diagnostics. |
| SSAHU1 | Filter Is Dirty |
| SSAHU1 | Space Sensor Not Reading Within Tolerance |
| u/t-1 | System Is Unable To Achieve 100% Heating |
| u/t-1 | Space Sensor Not Reading Within Tolerance. |
| vav1 | Damper Is Non-Operational |
| WSHP1 | No Condenser Water Flow |
| WSHP1 | Space Sensor Not Reading Within Tolerance. |

⎵ 1410

Submitted Values

| Name | Value |
|---|---|
| EquipmentTypes | Unit Heaters, Chilled/Hot Water Air Handling Units, Variable Air Volume Units, Rooftop Units, Water Source Heat Pumps, Split Systems |
| CityIH | 1 |
| CityCWAHU | 1 |
| CityRTU | 1 |

SERVICING, DIAGNOSING, LOGGING, AND SURVEYING BUILDING EQUIPMENT ASSETS

CROSS-REFERENCE TO RELATED APPLICATIONS

The present application claims the benefit of U.S. Provisional Application No. 62/815,794, filed Mar. 11, 2019, entitled "System and Method of HVAC Servicing, Diagnostics, and Logging," the entire disclosure of which is incorporated herein by reference.

BACKGROUND

Conventional approaches to servicing and maintaining building equipment systems, such as HVAC (Heating, Ventilation, and Air Conditioning) systems are subject to a number of shortcomings. For example, one shortcoming with conventional approaches is that there are few standard service methodologies, which may make it difficult to understand whether or not equipment unit performance has been properly achieved as a result of maintenance or repairs. Additionally, there isn't a parity of skills among field service technicians that perform maintenance and conduct equipment repairs.

Many conventional approaches begin by requiring the technician to connect to refrigerant sealed circuit lines at the outset. In many instances, it is not necessary to connect to the refrigerant circuit to diagnose an issue. Connecting to the sealed refrigerant circuit is invasive and introduces the possibility of introducing contamination into the circuit thereby causing harm is done to the system being serviced for repairs. Another drawback to this approach is that connecting to the closed refrigerant circuit increases the safety risk to the technician in the field.

Another drawback with conventional approaches is that measurements taken by a technician are recorded on a paper service ticket. One problem with this approach is that paper service ticket measurements are not easily available for subsequent use or interactive diagnostics. An additional shortcoming with a conventional service approach is a lack of verifying that service work performed on a unit actually corrected a problem with the unit. As such, conventional approaches provide very little to no visibility into results achieved. Accordingly, clients may not have any real way to know if repairs or service carried out on building equipment was effective prior to paying for service and/or replacement parts.

BRIEF DESCRIPTION OF THE DRAWINGS

These drawings illustrate certain aspects of some of the embodiments of the present disclosure and should not be used to limit or define the disclosure.

Figure 5:
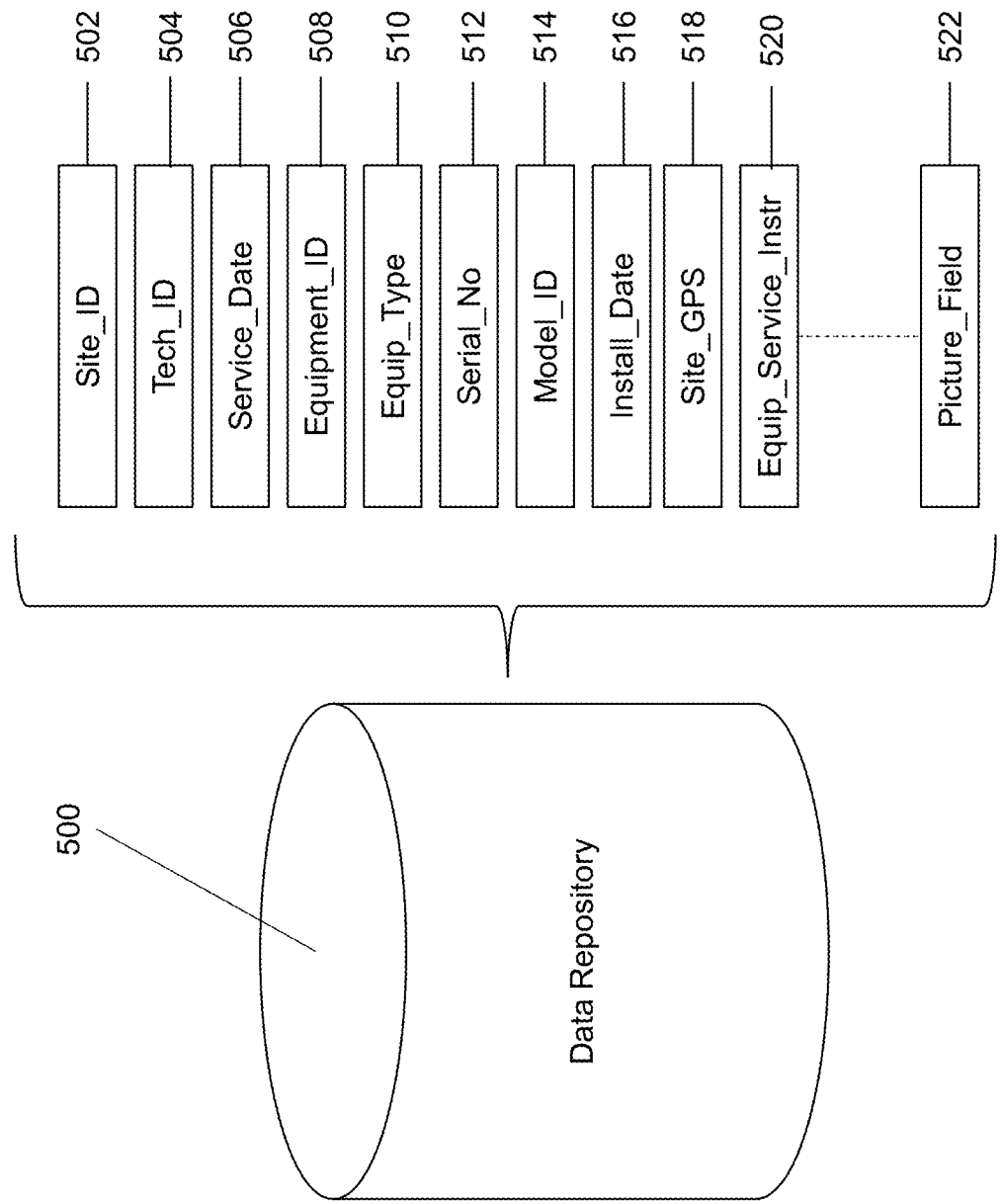
FIG. 5 illustrates an information repository in accordance with an embodiment of the present disclosure.
Figure 8:
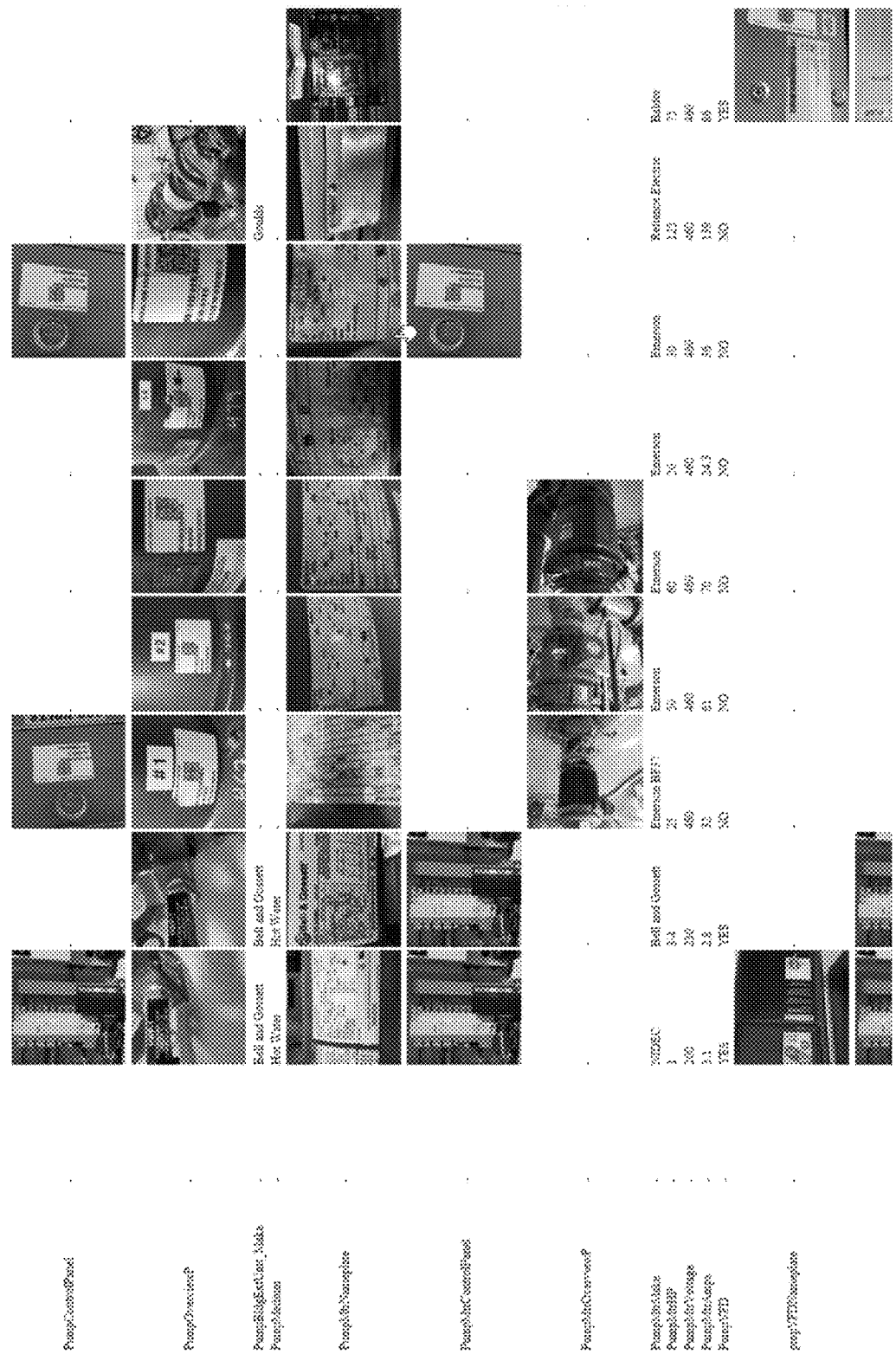
Figure 10:
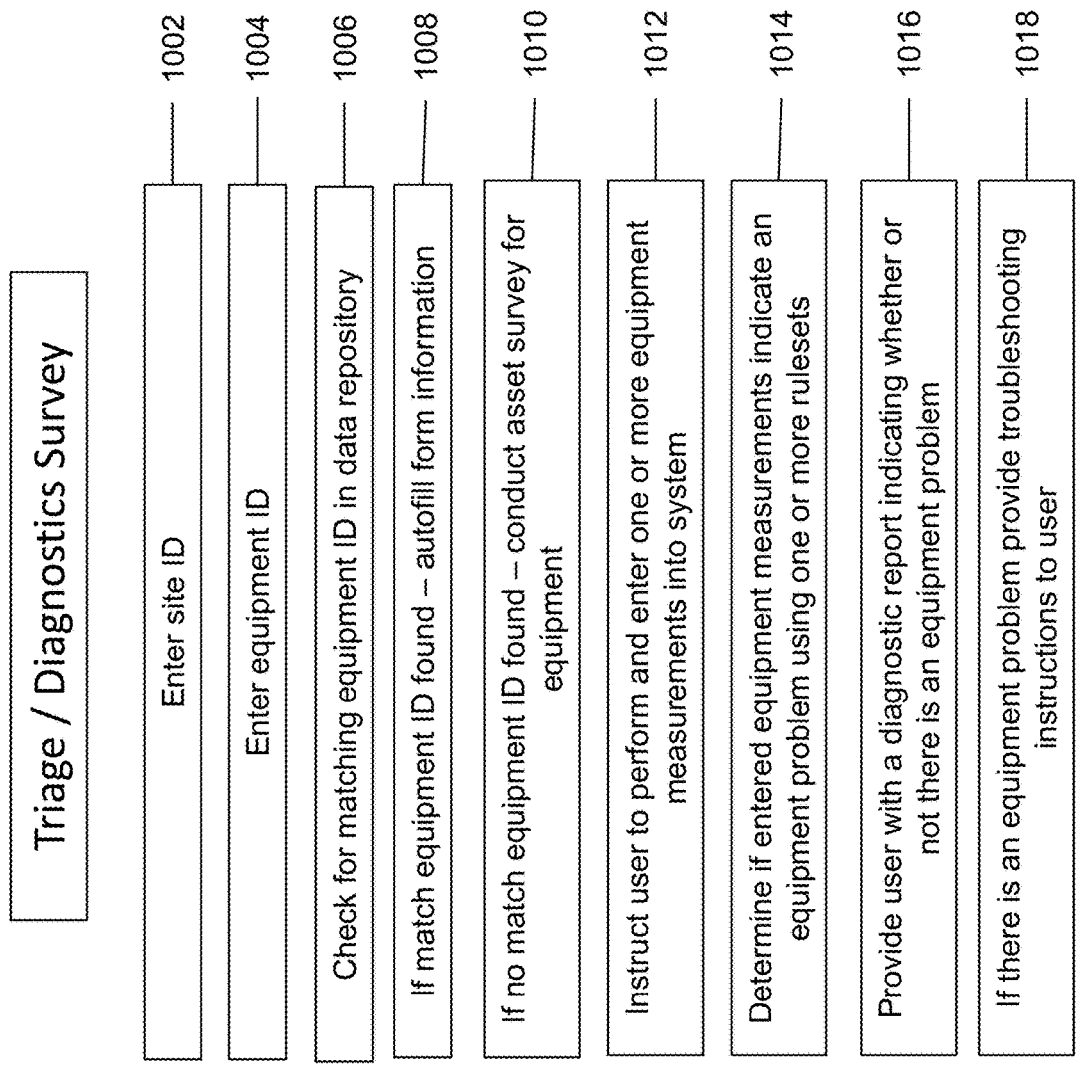
Figure 11:
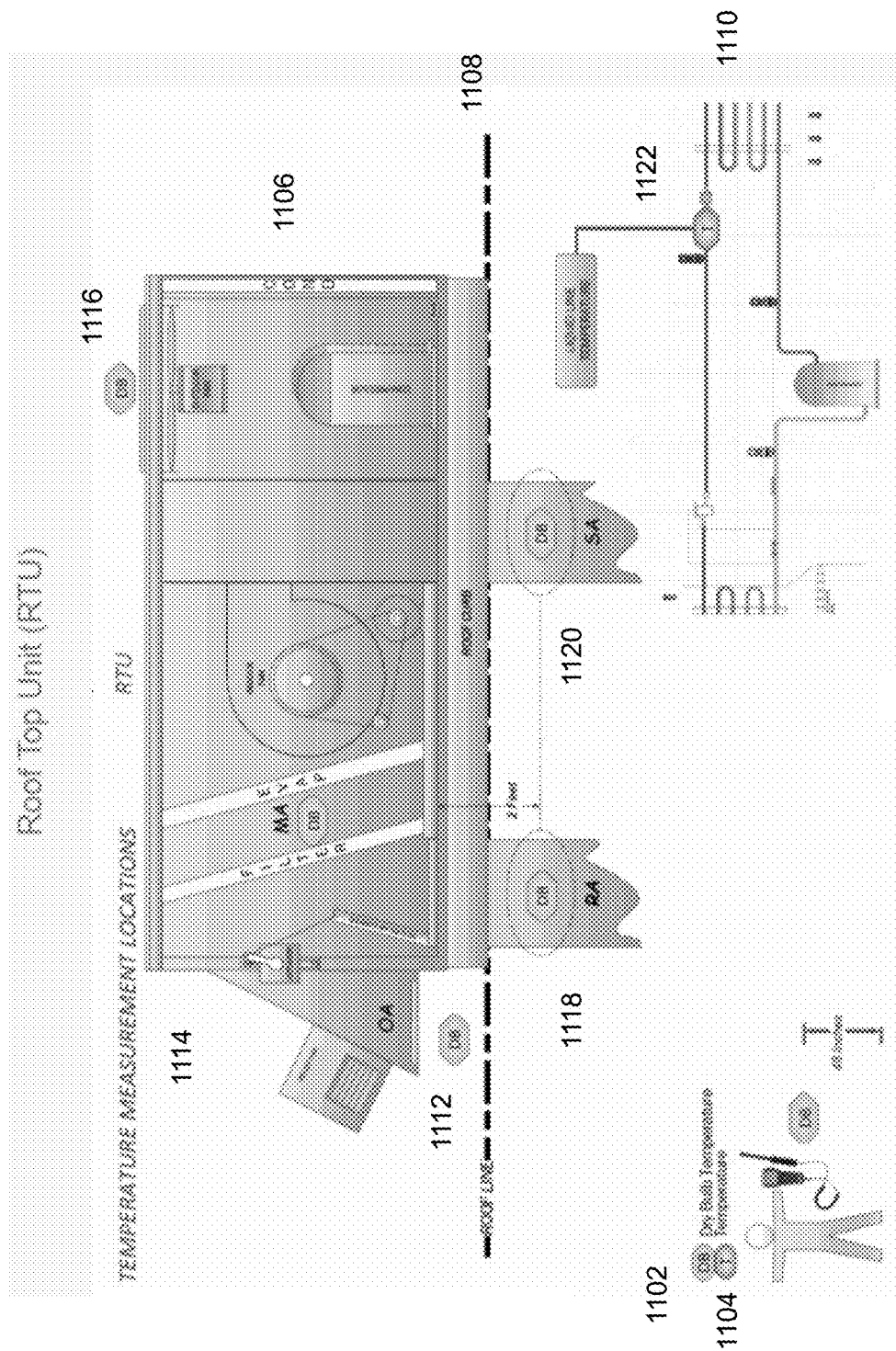
Figure 12D:
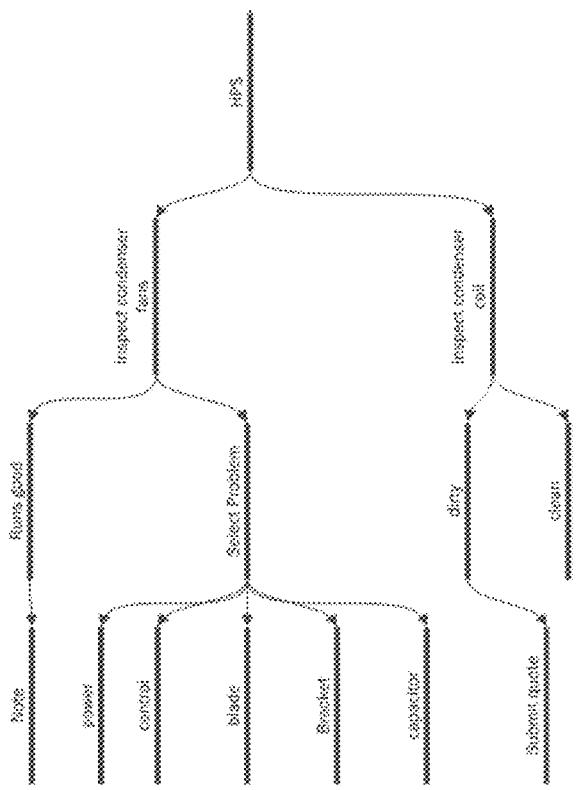
Figure 12C:
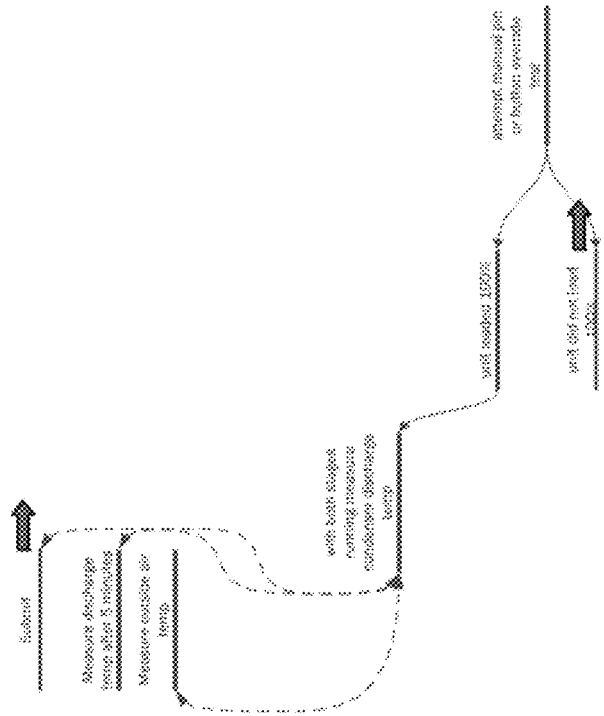
Figure 15:
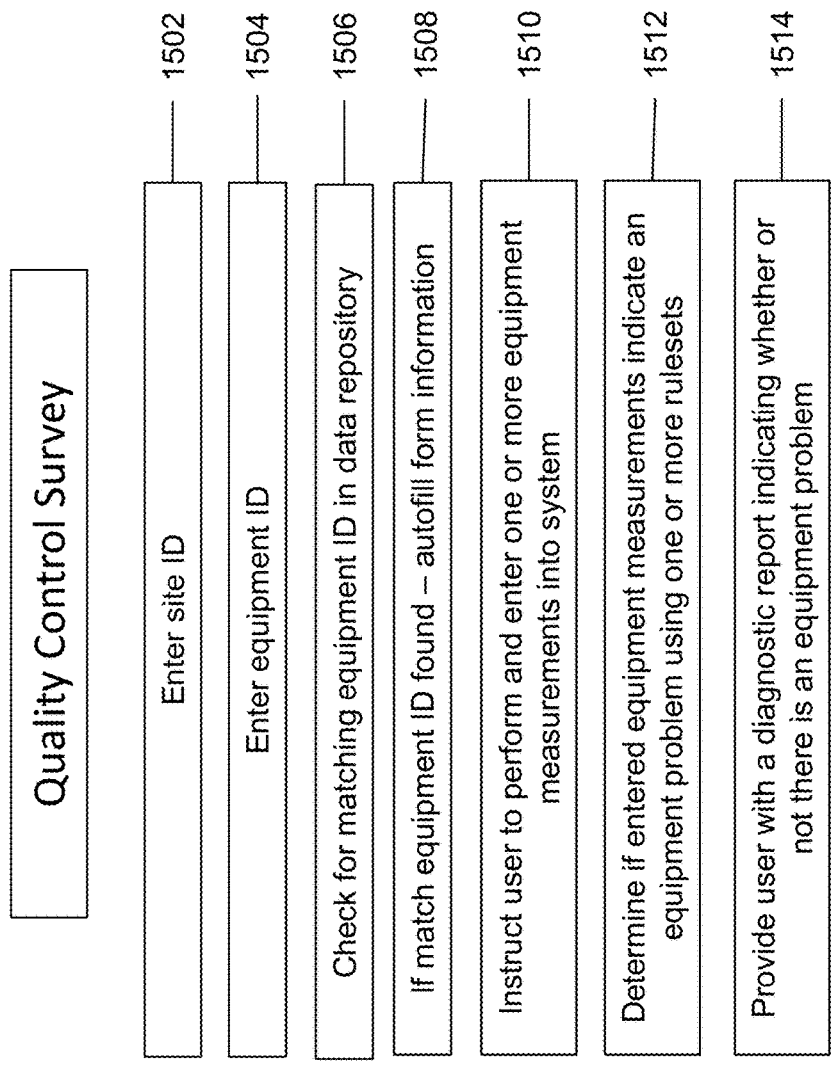
Figure 17:
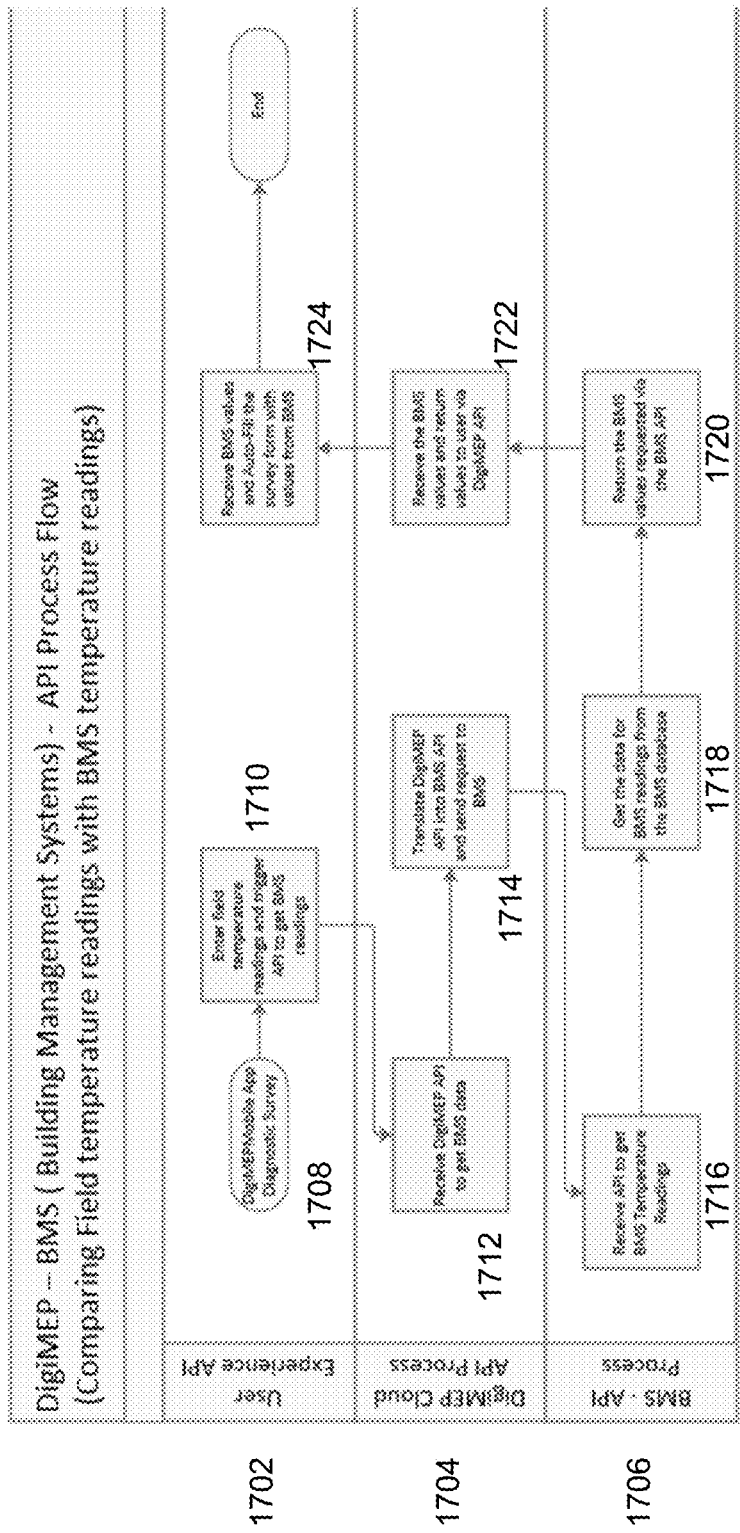

illustrates an example workflow for conducting a site inventory asset survey;

FIG. 8 illustrates a visual example illustrating information stored in the example information repository of FIG. 5 according to an embodiment of the present disclosure;

illustrates an example input form for collection of measurement data by a field technician;

Figure 9:
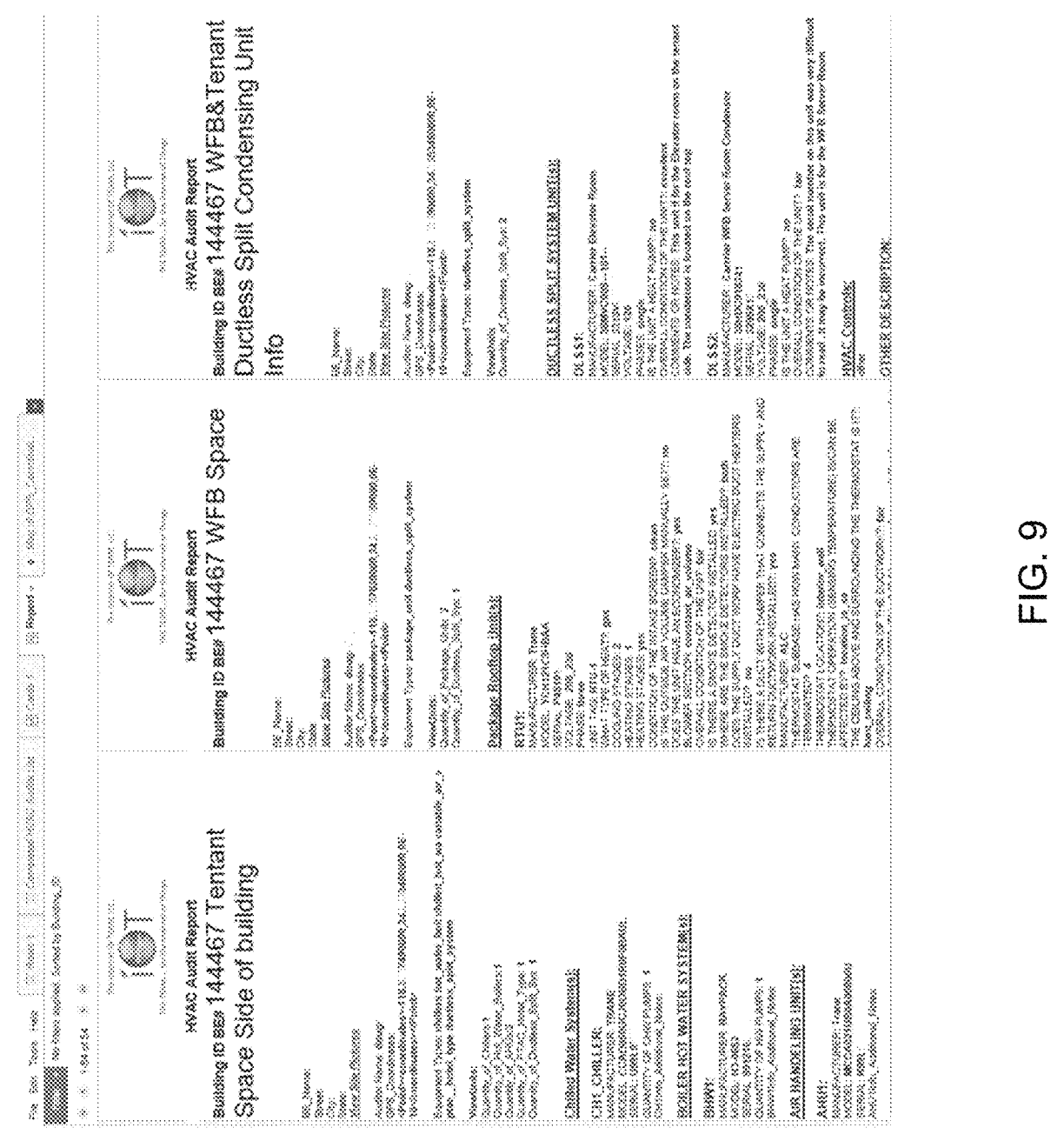

FIG. 9 illustrates an example report displaying the results of an inventory asset survey in accordance with an embodiment of the present disclosure;

FIG. 10 illustrates an example workflow for conducting a triage/diagnostic survey according to an embodiment of the present disclosure FIG. 11 illustrates an example equipment instruction diagram provided to a field technician in accordance with an embodiment of the present disclosure;

FIGS. 12A-D illustrate exemplary diagnostic rulesets and resulting instructions conveyed to a field technician in accordance with an embodiment of the present disclosure;

Figure 13:
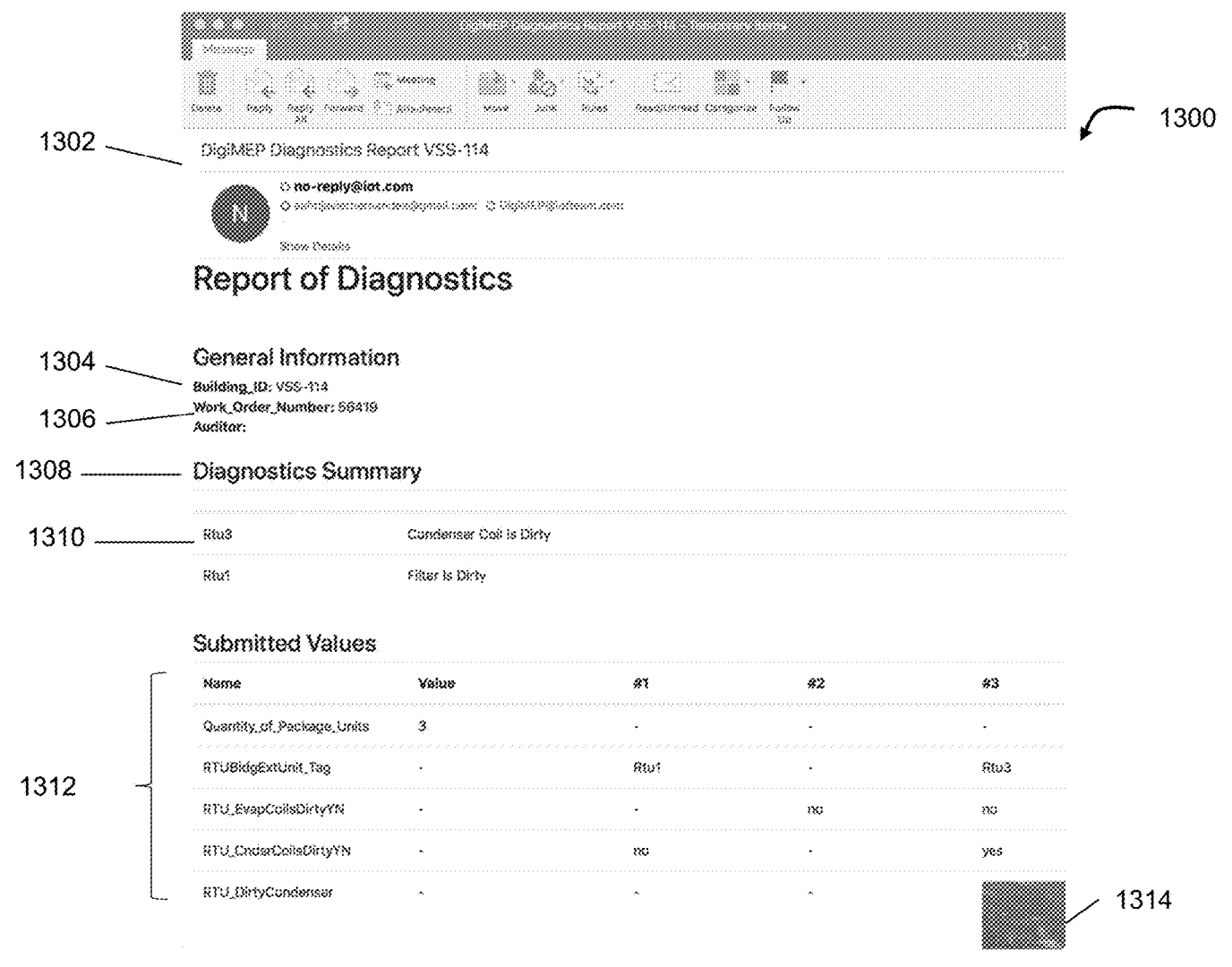

FIG. 13 illustrates an example diagnostic report in accordance with an embodiment of the present disclosure;

FIG. 14 illustrates an alternate example diagnostic report in accordance with an embodiment of the present disclosure;

FIG. 15 illustrates an example workflow for conducting quality control survey in accordance with an embodiment of the present disclosure;

Figure 16:
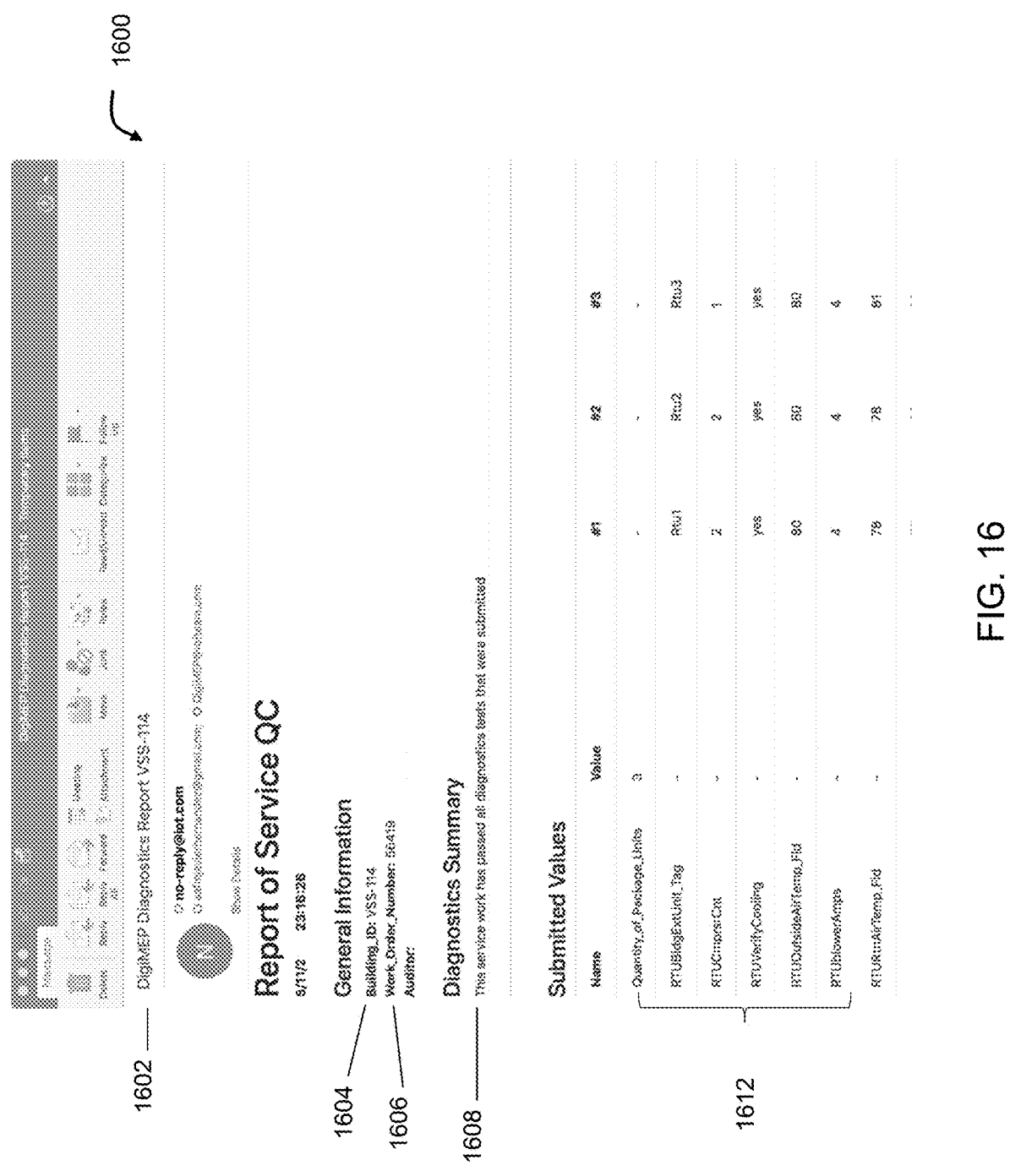

FIG. 16 illustrates an example diagnostic report in accordance with an embodiment of the present disclosure; and FIG. 17 illustrates an example workflow for interfacing with building controls in accordance with an embodiment of the present disclosure.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure is generally related to surveying and diagnosing building equipment and, more particularly, a system and method for the implementation of performing and assisting in the inventorying, servicing, and diagnosing building equipment. The present disclosure includes a system that curates an environment for field technicians to perform site surveys, maintenance and service diagnostics, with one or more quality control checks, after the work is performed. Additionally, one embodiment of the present disclosure describes a digital technology enablement platform that may provide timely and efficient assistance to field service personnel. According to another embodiment, the technology enablement platform may provide real-time, or near real-time assistance. Another aspect of the present disclosure provides standardized technical methods, optimization procedures, and related methods.

An additional aspect of an embodiment according to the present disclosure includes a system that prompts a field technician with site specific survey questions and procedures to collect detailed information about the equipment installed at a site. Installed site equipment may include HVAC, lighting, metering, and BAS (Building Automation Systems) systems. According to another embodiment, the resulting site survey information may be uploaded to one or more databases/information repositories. The site survey information may be processed to create site output information in the form of a bill of materials, a RFP (request for proposal), and the like. Site output information may be sent to one or more third parties, such as mechanical contractors to procure integration bids, and to compile engineering drawings for a complete systems integration proposal. According to an embodiment of the present disclosure, the system architecture is flexible and customizable.

According to one aspect of the disclosure, an HVAC service application is provided that standardizes and supports field technician user methods of maintaining and repairing HVAC systems in real-time by providing automated diagnostics and quality control of completed repairs. An additional aspect of the present disclosure is the provision of a mobile interface for the collection of measurement readings, digitization of the readings, and use of this information to allow for the remote diagnosis of equipment problems by establishing and recording a baseline from which after service measurements may be taken to quantify and provably verify repairs and maintenance success. A further aspect of an embodiment of the present disclosure, is that an orderly sequence is provided to the field technician user to enable the application of an established, optimized method, for use by field technicians of varying skill and experience levels to correct equipment issues and perform maintenance services.

Methods according to the present disclosure may provide key performance indicators regarding field technician performance and real-time while supporting the technician with standardized methods and instructions to perform services as determined by diagnostics. Other methods according to an embodiment of the present disclosure provide a non-invasive method of diagnosing system performance without needing to connect to an onsite refrigerant sealed circuit.

It will be appreciated, that unlike conventional approaches that lack standardized procedures and instructions for surveys, service, and maintenance, embodiments in accordance with the present disclosure may optimize and fine tune various system service components to support the servicing, surveying, and maintenance of building equipment and control systems. While some service companies have developed training programs for technicians and may employ some isolated electronic service enablement applications, such isolated applications and training efforts fall short of the functionality provided by one or more embodiments of the present disclosure.

Methods according to the present disclosure include may use of HVAC refrigerant temperature correlations and these correlations have been incorporated into one or more algorithms to verify if components of a building HVAC system is operating as designed. An aspect of an embodiment in accordance with the present disclosure provides a system that enables field technicians with customized instructions to measure onsite equipment to accurately diagnose any issues to be addressed. The system allows a field technician, or owner of a service company to perform repeatable and accurate diagnosis without proprietary and/or expensive specialized instruments.

In the following description, numerous details are set forth to provide an understanding of the present disclosure. However, it will be understood by those of ordinary skill in the art that the present disclosure may be practiced without these details and that numerous variations or modifications from the described embodiments may be possible. The disclosure will now be described with reference to the figures, in which like reference numerals refer to like, but not necessarily the same or identical, elements throughout. For purposes of clarity in illustrating the characteristics of the present disclosure, proportional relationships of the elements have not necessarily been maintained in the figures.

Specific examples pertaining to the system are provided for illustration only. The arrangement of steps in the process or the components in the system described in respect to a mobile application for the system may be varied in further embodiments in response to different conditions and requirements. In such further embodiments, steps may be carried out in a manner involving different graphical displays, queries, analyses thereof, and responses thereto, as well as to different collections of data. Moreover, the description that follows includes exemplary apparatuses, methods, techniques, and instruction sequences that embody techniques of the disclosed subject matter. It is understood, however, that the described embodiments may be practiced without these specific details or employing only portions thereof.

Figure 1:
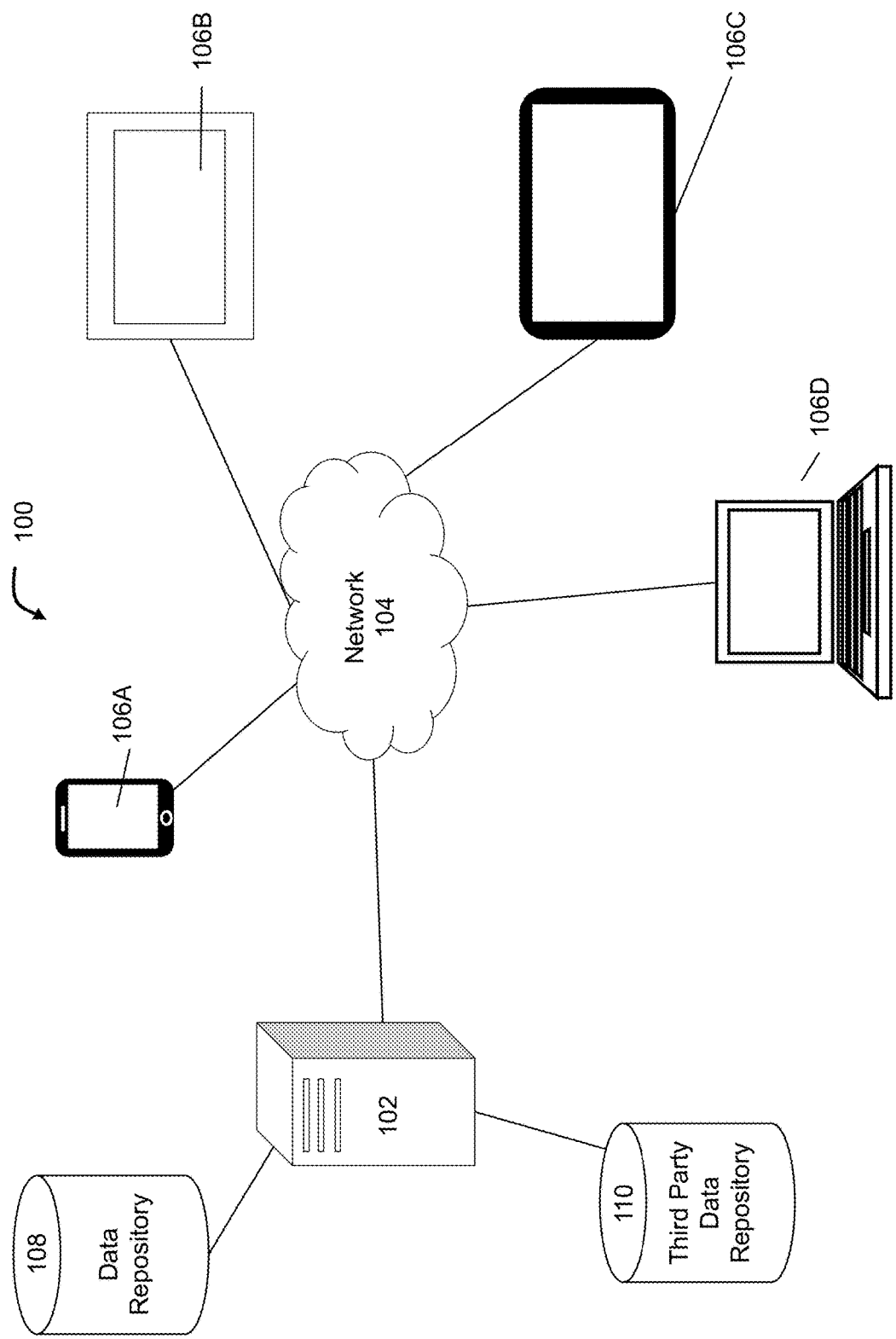
FIG. 1 illustrates an example of an information handling system in accordance with one embodiment of the present disclosure.

Referring now to the drawings in which like numerals represent like elements or steps throughout the several views, FIG. 1 is block diagram of an information handling system 100 for providing a system for supporting provision of services in accordance with the present disclosure. Information handling system 100 may include a server 102, attached via network 104 to one or more networked devices 106A-D.

As shown server, 102 is attached to one or more data repositories including data repository 108 and third-party data repository 110. Information repositories 108, 110, may include detailed schematic diagrams of site equipment, service troubleshooting algorithms, site notes, equipment conditions, detailed configuration specifications, commissioning specifications, building control system parameters, diagnostic rulesets, and the like.

Server 102 may transmit information from one or more data repositories 108, 110 for distribution over network 104 to one or more network connected devices 106A-D. In an example embodiment, server 102 may process and provide information from an equipment repository 108 for equipment specifications concerning an installed appliance or environmental system. Server 102 may include a graphics library associated with providing design information associated with layout, fonts, colors, and the like that are associated with a display or mobile diagnostic application. Server 102 may comprise a computing device as described below with respect to FIG. 2. Consistent with embodiments of the disclosure, server 102 may comprise one or more software applications (i.e., a series of instructions configured for execution by a processing unit) associated with another component, such as one or more servers or dedicated content devices.

Network 104 (also referred herein as distribution network or communication network) is, generally, used and implemented by a service provider (such as, but not limited to, a wired and/or wireless communication service provider). Network 104 additionally refers to infrastructure, including apparatuses and methods, operative and utilized to communicate data and/or signals between information handling system 100 and networked devices 106A-D. Similarly, for example and not limitation, network 104 may include current and future wired and/or wireless communication infrastructure for communicating data and/or signals with other communication networks, such as the internet. Network 104 may take one or more forms, or a combination thereof. Network 104 may also allow for real-time, off-line, and/or batch transactions to be transmitted between or among information handling system 100 and one or more networked devices, such as data repositories 108, 110. Due to network connectivity, various methodologies as described herein may be practiced in the context of distributed computing environments.

Additionally, network 104 may include any telecommunication and/or data network, whether public, private, or a combination thereof, including a local area network, a wide area network, an intranet, an internet, the Internet, intermediate hand-held data transfer devices, and/or any combination thereof and may be wired and/or wireless. Network 104 may also allow for real-time, off-line, and/or batch transactions to be transmitted between or among server 102 and networked devices 106A-D. Due to network connectivity, various methodologies as described herein may be practiced in the context of distributed computing environments.

Although networked devices 106A-D are shown for simplicity in an example embodiment as being in communication with server 102 via one intervening network 104, it is to be understood that other network configurations may be used. For example, intervening network 104 may include a plurality of networks, each with devices such as gateways and routers for providing connectivity between or among networks. Instead of, or in addition to network 104, dedicated communication links may be used to connect the various devices in accordance with example embodiments of the disclosure. For example, one or more networked devices 106A-D may form the basis of network 104 that interconnect one or more networked devices 106A-D.

As shown in FIG. 1, server 102 and networked devices 106A-D may be in communication with each other via a network such as network 104, which as described herein can include one or more separate or shared private and public networks, including the Internet or a publicly switched telephone network. Networked devices 106A-D may include a stand alone or integrated devices such as a smart phone, tablet, pc, media server, television tuner, satellite or cable receiver, digital video recorder, streaming video player, video game console, Blu-ray player, and the like. Networked devices 106A-D may also include LCD display devices such as a monitor featuring an operating system, media browser, and the ability to run one or more software applications.

Server 102 is shown in communication with multiple data repositories 108, 110.

Configuration information may be stored in any computer readable form. Configuration data repository 108 enables an aspect of the present system and method to retrieve equipment operating parameters. While illustrated as separate data repositories, it is to be understood that information included in repositories 108 and 110 may be stored in a single repository, or multiple repositories across different locations. Further according to some embodiments of the present disclosure, all or portions of information included in repositories 108 and 110 may be stored or cached locally on one or more networked devices 106A-D.

Figure 2:
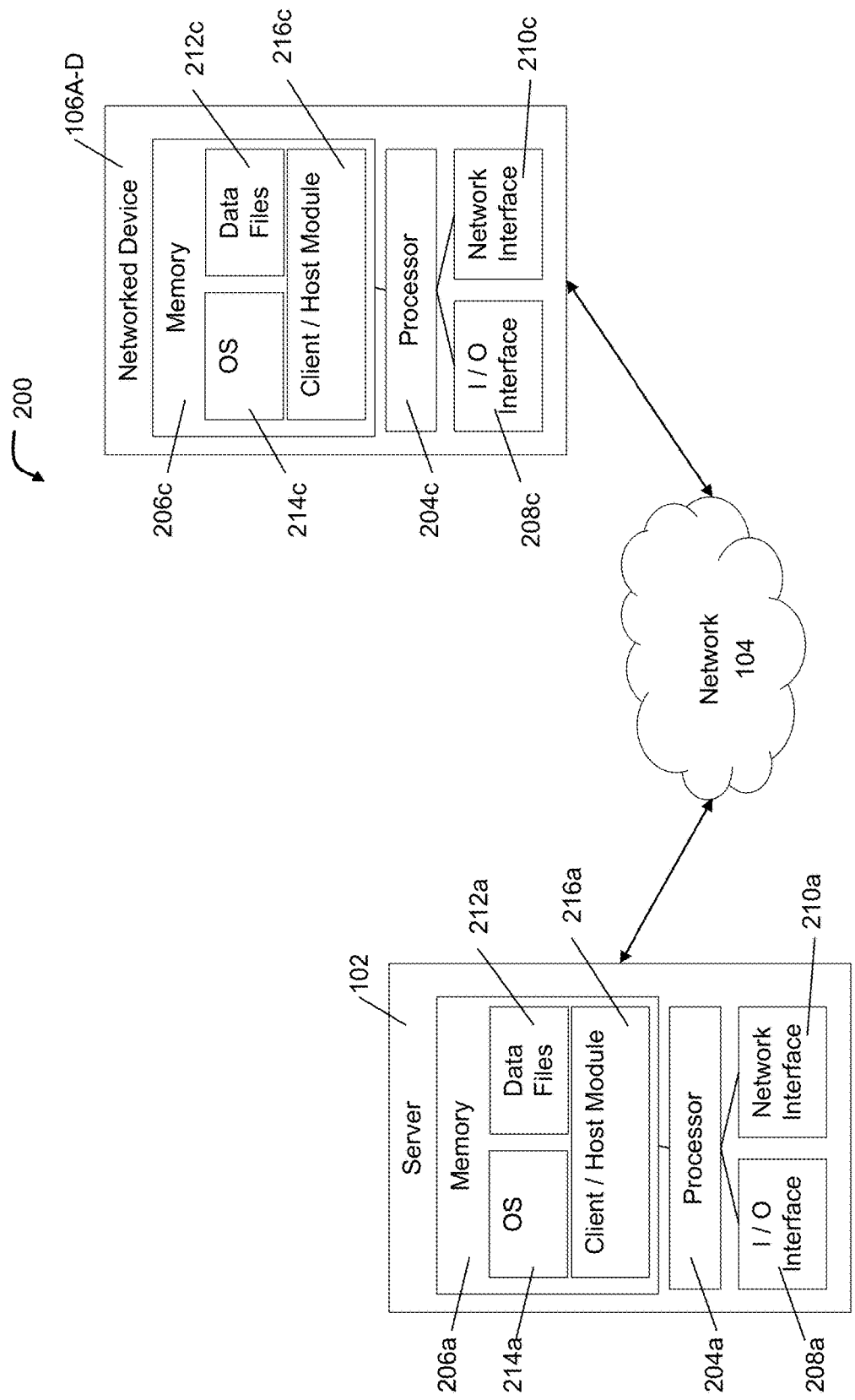
FIG. 2 illustrates example elements of the information handling system of FIG. 1.

FIG. 2 illustrates an information handling system 200 for supporting provision of site services according to an example embodiment of the disclosure. Server 102 and networked devices 106A-D may be any processor-driven device, such as, but not limited to, a personal computer, laptop computer, smartphone, tablet, handheld computer, dedicated processing device, and/or an array of computing devices. In addition to having processor 204, server 102 and networked devices 106A-D may further include memory 206, input/output ("I/O") interface(s) 208, and network interface 210. Memory 206 may be any computer-readable medium, coupled to the processor, such as RAM, ROM, and/or a removable storage device for storing data files 212 and a database management system ("DBMS") to facilitate management of data files 212 and other data stored in memory 206 and/or stored in separate databases. Memory 206 may store data files 212 and various program modules, such as operating system ("OS") 214 and client module 216. OS 214 may be, but is not limited to, Microsoft Windows®, Apple OSX®, Apple iOS®, Apple iPadOS®, Unix, Oracle Java®, Linux, Android, or a mainframe operating system. Client module 216 may be an Internet browser or other software, including a dedicated program, for interacting with server 102 and networked devices 106A-D.

Suitable processors, such as processors 204 of server 102 and networked devices 106A-D, respectively, may comprise any processor including but not limited to a microprocessor, RISC, ARM, ASIC, and/or a state machine. Example processors may include those provided by Intel Corporation, AMD Corporation, ARM Holdings, IBM, Qualcomm, Nvidia, Broadcom, Samsung, Marvell, TSMC, Apple, Texas Instruments, and Motorola Corporation. Such processors comprise, or may be in communication with media, for example computer-readable media, which stores instructions that, when executed by the processor, cause the processor to perform the elements described herein.

Generally, each of the memories and data storage devices, such as memories 204 and databases 108, 110 (as shown in FIG. 1), and/or any other memory and data storage device, can store data and information for subsequent retrieval. In this manner, systems can store various received or collected information in memory or a database associated with server 102 and networked devices 106A-D. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

As used herein, the term "computer-readable medium" may describe any form of memory or a propagated signal transmission medium. Propagated signals representing data and computer program instructions may be transferred between network devices and systems. Embodiments of computer-readable media include, but are not limited to, electronic, flash, optical, solid state, magnetic, or other storage or transmission device capable of providing a processor with computer-readable instructions. Various other forms of computer-readable media may transmit or carry instructions to a computer, including a router, private or public network, or other transmission device or channel, both wired and wireless. The instructions may comprise code from any computer-programming language, including but not limited to, for example, basic, binary, machine code, C, C++, C#, objective-C, Cobol, HTML, Java, JavaScript, Lisp, Markdown, Pascal, Perl, PHP, Python, Ruby, SQL, Swift, Visual Basic, XML, and R.

When needed, data or information stored in a memory or database may be transmitted to a database, such as information repositories 108, 110, capable of receiving data, information, or data records from more than one database or other data storage devices. In other embodiments, the data repositories 108, 110 shown may be integrated or distributed into any number of databases or other data storage devices.

Generally, network devices and systems, server 102 and networked devices 106A-D have hardware and/or software for transmitting and receiving data and/or computer-executable instructions over a communications link and a memory for storing data and/or computer-executable instructions. These network devices and systems may also include a processor for processing data and executing computer-executable instructions locally and over network 104, as well as other internal and peripheral components that are well known in the art.

Still referring to server 102 and networked devices 106A-D, the I/O interface(s) 208 may facilitate communication between the processor 204 and various I/O devices, such as a keyboard, mouse, printer, microphone, speaker, monitor, bar code readers/scanners, RFID readers, and the like. Network interface 210 may take any of a number of forms, such as a network interface card, a modem, a wireless network card, and the like. It will be appreciated that while server 102 and networked devices 106A-D have been illustrated as a single computer or processor, the server 102 and networked devices 106A-D may be comprised of a group of computers or processors, according to an example embodiment of the disclosure.

Information processing systems 100, 200 shown in and described with respect to FIGS. 1 and 2 are provided by way of example only. Numerous other operating environments, system architectures, and device configurations are possible. Other system embodiments can include fewer or greater numbers of components and may incorporate some or all of the functionality described with respect to the system components shown in FIGS. 1 and 2. For example, in one embodiment server 102 and networked devices 106A-D may be implemented as a specialized processing machine that includes hardware and/or software for performing the methods described herein. In addition, the processor and/or processing capabilities of server 102 and networked devices 106A-D, or any portion or combination thereof. Accordingly, embodiments of the disclosure should not be construed as being limited to any particular operating environment, system architecture, or device configuration.

Figure 3:
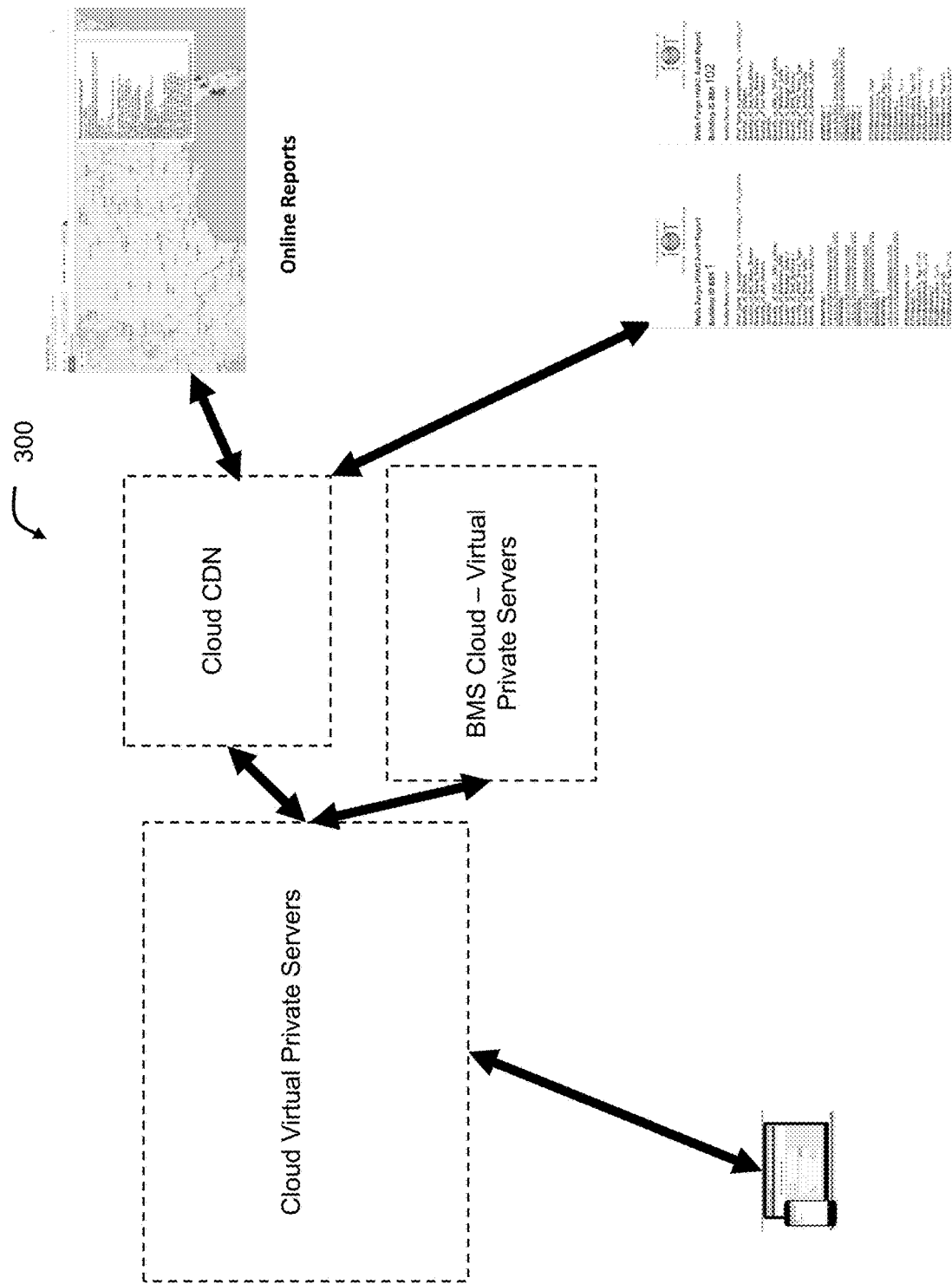
FIG. 3 illustrates an example system diagram in accordance with an embodiment of the present disclosure.

FIG. 3 shows an exemplary embodiment of a system 300 for enabling servicing, diagnosing, quality control, and surveying site assets according to an aspect of the present disclosure. Certain embodiments of the present disclosure comprise: a mobile interface for use by a field technician to collect site information including measurements, photos, and associated metadata which may be then sent to one or more information repositories. Components according to one or more embodiments of the system may include a cloud based platform with one or more virtual private services with firewall, load balancing, web server, app server, database server, API server, content delivery network (CDN) for storing and delivering images and reports, as well as custom forms and reports.

A mobile interface component of the system may be provided via a custom phone or tablet based application, or via secure connection over a mobile internet browser. According to one embodiment the mobile interface is a dedicated application called the DigiMEP Mobile iPhone app and Android app. The mobile interface provides remote service support for field service technicians, job installers, project managers, and general contractors to capture and report critical details from the field; with measurements, photos, and GPS coordinates, to verify compliance and labor performance and real-time fault detection/quality control of field service work and new construction. An exemplary system is shown in FIG. 3 which include the following components according to an embodiment of the present disclosure. As shown the system 300 (DigiMEP) includes a cloud-based Virtual Private Server (VPS) and Content Delivery Network (CDN). Additionally shown, is the a BMS (Business Management System) virtual private server. As shown, the depicted components are in secure connection with one or more other components. Also shown is a mobile interface as used by a field technician to securely communicate and interact with the system. Also shown are offline reports and a diagnostic report that may be generated by the exemplary system 300. It should be noted that mobile data interface and mobile interface are used interchangeably herein.

Figure 4:
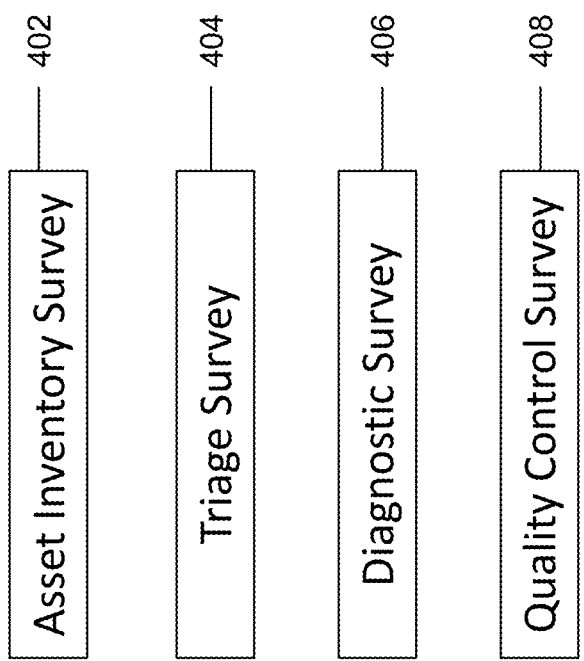
FIG. 4 illustrates example service survey types in accordance with an embodiment of the present disclosure.

FIG. 4 shows survey types according to an embodiment of the present disclosure. As shown in FIG. 4, a user, such as a field technician, may conduct one or more surveys upon arrival to a service location. The first type is a site asset survey 402 in which one or more equipment units at a particular building site location may be inventoried. The second survey type is a triage survey 404 which may be used by the field technician to identify which unit or units are experiencing problems, following an initial site asset survey where information concerning the site equipment is entered. The next type of survey is a diagnostic survey 406, which is carried out by the field technician to identify what problem or problems are present unit flagged by the triage survey. Finally, a QC (quality control) survey 408 may be carried out after all repairs to the units have been completed so that the field technician may document the success of the repair work and confirm the proper operation of the repaired unit.

Methods according to the present disclosure include a platform that may enable the following: assisted diagnosis of mechanical deficiencies via a mobile application that communicates to a back end system for triage and diagnosis, where the back end system processes inputs, and provides rapid feedback to field technician via the application of equipment issues and solutions to resolve the issues. Access to one or more information repositories in a cloud-based data center that stores and processes all real-time data allowing customer and service company that employees technician to have full access to all results near real-time while the field technician is still onsite performing work.

A platform for all systems performance measured by standard instruments to be stored and used for current and all future reporting and support efforts. Some diagnostic tools used by field technicians may use to obtain information for a survey include an air CO2 meter, humidity meter, air temperature meter, thermocouples, and a voltmeter such as a digital multi-meter. Various types of air temperature sensors may be used including a piercing type for measurement of chilled water temps and insertion into ducts as well as a clamp on type for refrigerant piping temps and for securing onto a condenser fan shroud or in the unit on a bracket. A system and method that facilitates curation of standardized technical methods across all technicians in field. A field technician may use readily available diagnostic tools to obtain measurements for entry into the mobile application.

One benefit of standardization according to an embodiment of the present disclosure is that increased levels of systemization and optimization by providing a field technician user with a set of consistent and verified service procedures. Remote support of field technicians according to an embodiment of the present disclosure provide documentation of performed procedures, information to report on system performance, in addition to providing information regarding the aptitude of the field technician.

FIG. 5 shows an exemplary data repository 500 according to an embodiment of the present disclosure. Data repository 500 may be a single database, or several data bases. As shown, data repository 500 includes site_ID 502, which may be a unique identification value used for a particular building or site location. Tech_ID 504, may be the identity of the field technician user responsible for entering the information about site_ID 502 into the database. Additional data repository 500 may include, Service date 506, Equipment_ID 508, Serial_No 510, Model_ID 514, Install_Date 516, Site_GPS 518, Equip_Service_Instr 520, and Picture_Field 522. It will be appreciated that the aforementioned database fields are exemplary and not limiting. Additional fields and linking fields may be used and are within the scope of the present disclosure. For example, Equip_Service_Instr 520 may link to another data repository and include a set of instructions, prompts, algorithms, and the like to provide a field technician user with instructions to service, diagnose, and verify repairs performed on equipment units installed at a building site.

Figure 6:
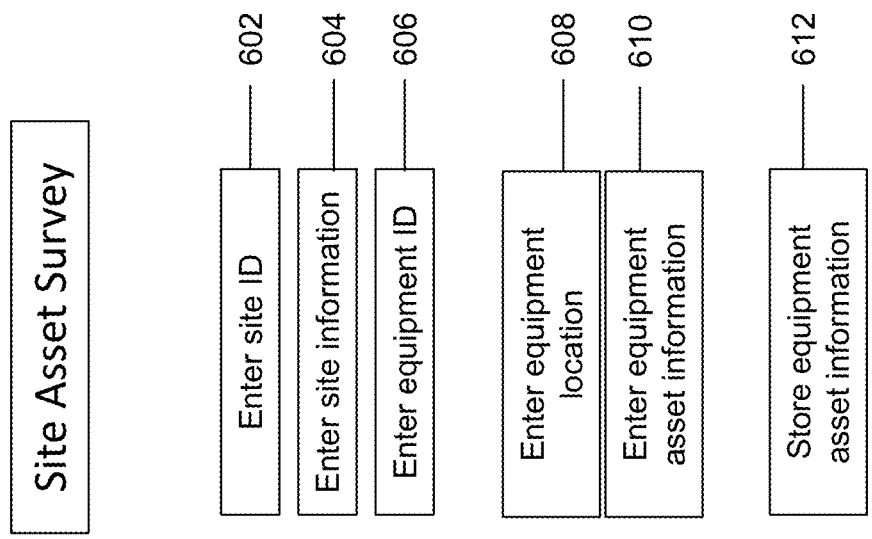
FIG. 6 illustrate an example workflow for conducting a site inventory asset survey in accordance with an embodiment of the present disclosure.

FIG. 6 illustrates an example workflow for conducting a site inventory asset survey in accordance with an embodiment of the present disclosure. Upon arrival, a field technician user begins the asset survey using a mobile interface. The mobile interface may be a dedicated application for use with a phone, tablet, or other computing device, such as those described 106A-D in FIG. 1. The mobile interface is used to collect and enter site identification information into one or more data repositories such as data repository 500 as shown in FIG. 5. To begin, block 602 indicates that a site ID is to be entered. Block 604 indicates that site information is to be entered. Site information may include a site address, GPS (Global Positioning System) coordinates, and a site id. Other information may be automatically collected and associated with site information the identity of the field technician user, the date of the survey, and a work order number.

Upon establishment of a site ID in per block 602 and entering site information per block 604, the user may collect and enter information about equipment assets installed or located at the site. In block 606, the user enters an equipment ID. In block 608, the user enters equipment location information. It should be noted that site ID and building ID are used interchangeably. Equipment location information may include floor number, room number, roof parameters, basement, parameters, access codes, and other information that may be used to locate equipment at site. In block 610, equipment asset information is entered. Equipment asset information may include, but is not limited to information for HVAC equipment, building controls, telecommunication equipment, alarms, detectors, water treatment systems, plumbing fixtures, auxiliary generators, escalators, elevators, forklifts, loading dock equipment, brewery equipment, and manufacturing equipment.

For each equipment asset, the user collects and enters equipment asset information which may include an equipment type, a serial number, equipment location, equipment components, model number, brand, specifications, capacities, implementation notes, and equipment condition. Additional equipment asset information may include digital photographs of a manufacturer label, install location, and equipment components. According to some embodiments, some digital photographs may be mandatory fields. According to some embodiments, the user may use the mobile interface to automatically collect equipment asset information from a digital photograph a bar code or optical character recognition. Once building site and equipment asset information has been collected, the information is stored in one or more data repositories such as data repository 500. In addition to storing the information in one or more data repositories, the information may also be stored locally on a mobile device.

Figure 7A:
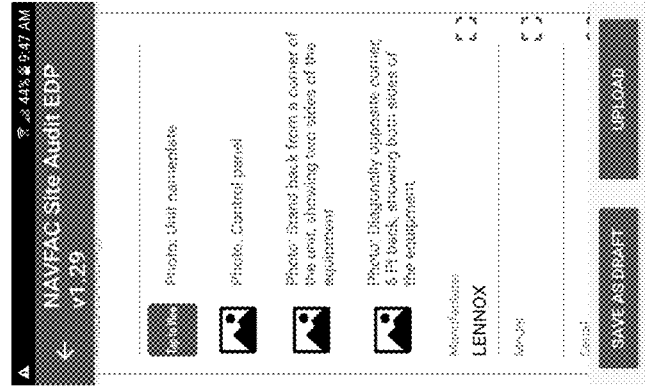
FIGS. 7A-C illustrate example input screens for collection of site inventory asset survey data by a field technician in accordance with an embodiment of the present disclosure.
Figure 7B:
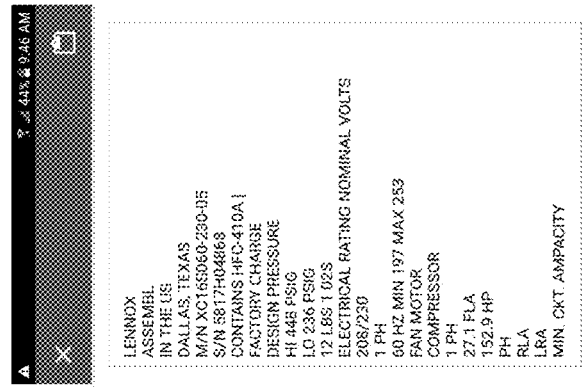
Figure 7C:
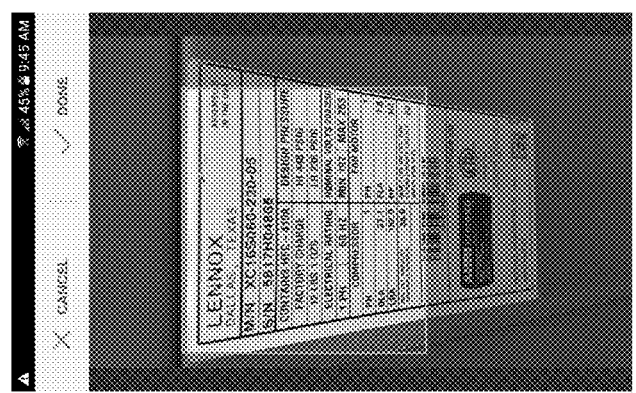

FIGS. 7A-C illustrate example input screens for collection of site inventory asset survey data by a field technician in accordance with an embodiment of the present disclosure. As shown, in FIG. 7A, 702 shows a mobile data input interface using a camera. 704 shows a camera view of an equipment label with manufacturer, model number, serial number, ratings, and other details where a portion of the label is selected. In FIG. 7B, 706 shows a text version of the values captured via camera in FIG. 7A. In some embodiments, OCR (Optical Character Recognition) technology is used. For input text fields, an embodiment of the present disclosure allows the user to take a photo and enter the data via OCR. For example, make, model, equipment the user can select OCR by tapping icon 710 as shown in FIG. 7C, take a photo, or select from a photo gallery, select the text, and it will be pasted into the field. According to an embodiment of the present disclosure, some photos are required to be taken as part of a survey. Examples of required photos may include unit nameplate, control panel, a photo showing two sides of the equipment, and a photo taken from the opposite direction showing two sides of the equipment.

FIG. 8 illustrates a visual example illustrating information stored in the example information repository of FIG. 5 according to an embodiment of the present disclosure.

illustrates an example input form for collection of measurement data by a field technician.

FIG. 9 illustrates an example report displaying the results of an inventory asset survey in accordance with an embodiment of the present disclosure.

FIG. 10 illustrates an example workflow for conducting a triage/diagnostic survey according to an embodiment of the present disclosure. illustrates an example workflow for conducting a diagnostic survey according to an embodiment of the present disclosure. As discussed above with respect to FIGS. 6 and 7A-C, a site profile is stored in one ore more data repositories with associated equipment asset information.

When the field technician (user) arrives at a building site location, the user, via the mobile interface, enters in a location ID, such as "Building 101." If a site profile exists for "Building 101," the field technician may then select, from the list of one or more equipment units associated with the site, the unit to be worked on. For example, the field technician may select "RTU-1" from a drop-down menu to indicate that the equipment to be diagnosed or serviced is Roof Top Unit 1. Alternatively, the user can manually enter the information.

In block 1002, the user is to enter site ID. In block 1004, the user is to enter equipment ID. In block 1006, a check for matching equipment ID in data repository is conducted. In block 1008, if match equipment ID found, autofill information associated with the equipment ID into the mobile interface. In block 1010, if no match equipment ID is found, the user is instructed to conduct an asset survey to create a new equipment ID and enter associated equipment asset information. In block 1012, the user is instructed to perform and enter one or more equipment measurements into system. In block 1014, the system determines if entered equipment measurements indicate an equipment problem using one or more rulesets. In block 1016, the system is to provide user with diagnostic report indicating whether or not there is an equipment problem. In block 1018, If there is an equipment problem, the system is to provide troubleshooting information instructions to user.

The mobile application may then retrieve the equipment asset information from the data repository that corresponds to the selected equipment unit and populate fields in the mobile interface. According to one embodiment, this may be accomplished via an API (Application Program Interface) call to locate a building profile in the data repository and retrieve the equipment asset information to auto fill data fields in the application, such as model number and serial number. Additional information, such as prior service notes and measurements may also be retrieved from the data repository for reference and use by the field technician. The field technician may then compare the retrieved equipment information to the installed equipment to confirm that the technician has the correct equipment unit.

To conduct a triage survey, the field technician uses the mobile interface to determine what equipment to investigate for problems. An embodiment according to the present disclosure uses rulesets and algorithms to flag system issues and faults against data measurements performed by the field technician. Once the field technician has selected an equipment ID using the mobile interface, the associated equipment asset data is retrieved and displayed to the user. The field technician uses the mobile interface to indicates the problem type, if known. The mobile interface submits this information to the system. Upon receipt by the system, the system determines if there is an issue with the equipment unit in question. Once the field technician performs measurements as instructed by the mobile application, submits the obtained measurements via the application, a series of diagnostic rule sets are run against the measurement data to flag performance issues for a unit onsite.

Once a unit has been flagged as having performance issues, a diagnostic survey is performed by the field technician. A diagnostic survey may enable the field technician to determine what issues are present in a unit. The user begins the diagnostic survey by a review of triage notes. The user then performs inspection of the equipment. The mobile interface prompts the user to record equipment condition information and take pictures. The system sends instructions to take and record one or more measurements. The instructions are based on equipment asset information, such as model number. The instructions may also include a schematic of the unit that indicates where measurements are to be taken as shown in FIG. 11. It should be noted that the diagnostic survey does not begin with instructing the field technician to connect to the closed refrigerant circuit. This allows for validation of systems such as refrigerant systems without ever connecting gauges, in turn reducing the risk and cost associated with improper breaching of the systems. Each survey type instructs the field technician to upload pictures in relation to the issues and repairs so that there is a visual media backing to the reported conditions in the field.

The mobile interface then instructs the user to record measurements so as to have a baseline before making repairs. The user recorded measurements are submitted via the mobile interface to the system. The system receives the measurements and performs a series of diagnostics based on the operating parameters of the equipment ID and the associated equipment asset information. This may be accomplished by comparing the received measurements to rulesets are run against the measurement data to flag performance issues for a unit onsite. The system then sends the user a diagnostic report which indicates which repair services are to be performed. The system provides the user with instructions to conduct repairs, which are performed by the field technician user in accordance with the instructions supplied by the system. Upon completion of repairs, the field technician user then performs a quality control survey to verify the accuracy and effectiveness of the repairs. This survey type allows the field technician to ensure that repairs are finished, and the system is performing properly prior to leaving the site location. The quality control survey follows the same procedures as the diagnostic survey, however, pictures are taken after the repairs have been performed, and measurements are recorded after the repairs to determine if the values are different than the baseline measurements taken before making repairs and to determine if the measurements are within an acceptable range based at least in part on the equipment asset information.

FIG. 11 illustrates an example equipment instruction diagram provided to a field technician in accordance with an embodiment of the present disclosure; As shown, 1102 instructs the field technician that a dry bulb temperature probe will be used and a 1104 temperature probe will be used. Item 1106 indicates that the roof top unit is to be serviced. Item 1108 indicates the roofline. Item 1110 indicates that the second measurement location is located below the roofline 1108. Items 1112, 1114, and 1116 indicate the locations on the roof top unit 1106 where a dry bulb temperature measurement is to be taken. Item 1118 indicates that a dry bulb temperature measurement is to be taken in the return air duct below the roofline 1108. Item 1120 indicates that a dry bulb temperature measurement is to be taken in the supply air duct below the roofline 1108. Item 1122 indicates that a temperature measurement is to be taken below the roofline 1108 to measure the temperature of a liquid line.

FIGS. 12A-D illustrate exemplary diagnostic rulesets and resulting instructions conveyed to a field technician in accordance with an embodiment of the present disclosure. FIGS. 12A-D show rulesets and logic trees that may be used to instruct a field technician to conduct one or more survey types, such as triage, diagnostic, or quality control surveys. The depicted rulesets may be used after the field technician submits obtained measurements via the application, to run against the measurement data to flag performance issues for a unit onsite.

FIG. 13 illustrates an example diagnostic report 1300 in accordance with an embodiment of the present disclosure. The Diagnostics report label 1302 indicates that this is a diagnostics report generated by the system. The report 1300 also shows building ID 1304, work order 1306, and a diagnostics summary section 1308. Summary items 1310 indicates that the condenser coil is dirty for roof top unit 3 (Rtu3) and that the filter is dirty on roof top unit 1 (Rtu1). Submitted values 1312 indicate the measurements made and entered into the mobile interface by the field technician. Picture 1314 shows the condition of the dirty filter, prior to replacement.

FIG. 14 illustrates an alternate example diagnostic report in accordance with an embodiment of the present disclosure. Summary items 1410 section indicates a whole host of issues with site equipment. Submitted values 1412 indicate the measurements made and entered into the mobile interface by the field technician.

FIG. 15 illustrates an example workflow for conducting quality control survey in accordance with an embodiment of the present disclosure. In block 1502, the user is to enter site ID. In block 1504, the user is to enter equipment ID. In block 1506, a check for matching equipment ID in data repository is conducted. In block 1508, if match equipment ID found, autofill information associated with the equipment ID into the mobile interface. In block 1510, the user is instructed to perform and enter one or more equipment measurements into system. In block 1512, the system determines if entered equipment measurements indicate an equipment problem using one or more rulesets. In block 1514, the system is to provide user with diagnostic report indicating whether or not there is an equipment problem.

FIG. 16 illustrates an example diagnostic, quality control report in accordance with an embodiment of the present disclosure. FIG. 16 illustrates an example diagnostic report 1600 in accordance with an embodiment of the present disclosure. The Diagnostics report label 1602 indicates that this is a diagnostics report generated by the system. The report 1600 also shows building ID 1604, work order 1606, and a diagnostics summary section 1608. In this quality The summary items 1610 section does not indicate any flags or faults, which is indicative of successful repair service. Submitted values 1612 indicate the measurements made and entered into the mobile interface by the field technician.

FIG. 17 illustrates an example workflow 1700 for interfacing with building controls in accordance with an embodiment of the present disclosure. As shown, 1702 indicates the user experience via the mobile application, 1704 indicates a could application process, and 1706 indicates a building management system (BMS) process. Alternate embodiments of the system in accordance with the present disclosure may additionally integrate with building control systems, such as a BAS (Building Automation System). It should be noted that BAS and BMS are used interchangeably herein. Item 1708 indicates that a field technician is conducting a diagnostic survey via the mobile application. In item 1710, the field technician is instructed to enter temperature measurement readings and, upon submission, an API is triggered. In block 1712 the system receives an API call to request data from the BMS. In block 1714, the system translates the API request to a BMS API call and requests measurement information from the BMS. In block 1716, the BMS receives the API measurement information request for temperature readings. In block 1718, temperature reading measurement data is retrieved by the BMS and in block 1720, the BMS temperature reading measurement data is sent to the system. In block 1722, the system receives the BMS temperature reading measurement data and sends it to the field technician via the mobile application. In block 1724, the BMS temperature reading measurement data values are received by the mobile application and filled into the diagnostic survey form for use in diagnostic determinations.

In the case with building control system integration, the field technician is instructed via the mobile application to record a temperature measurement at one or more locations, a request is sent to the building control system (via API call) to retrieve corresponding temperature measurement values as measured by sensors in the BAS. The BAS values may then be populated into corresponding fields in the mobile data interface and stored. The difference between temperature measurement values recorded by the field technician and the values retrieved from the BAS are determined. For example, if the BAS system value differs from the value measured by the field technician on the supply air temp on a RTU, (55 degree F.), this produces a metadata point of temp difference, which is stored in the system and may be used to perform subsequent equipment diagnostic operations.

The system determines if the temperature difference exceeds a threshold value. If a threshold is exceeded, the system rules that trigger a fault indication to the field technician indicating that the difference is too high or too low. The system may then provide instructions to the field technician to adjust the tolerance of the high/low condition, for modification and retuning the building control system sensitivity if needed.

Alternate embodiments of the system may be integrated with work order management platforms as used by property and building management companies. Additional embodiments may also provide integration with one or more platforms to provide electronic billing, invoicing, and payments for direct and timely payment for work performed, provided that success of the maintenance or repair work has passed one or more quality control verifications by an embodiment of the system in accordance with the present disclosure. Should the maintenance or repair work has not pass a quality control verification, then payment for the work may be held pending a successful quality control survey. Additional embodiments may also allow for an element of socialization, and sharing of technician aptitude via performance records for use and reference by a customer when requesting service.

Numerous other operating environments, system architectures, and device configurations are possible. Other system embodiments may include fewer or greater numbers of components and may incorporate some or all of the functionality described with respect to the system components shown in FIGS. 1-3. For example, in one embodiment information handling systems 100, 200, 300 may be implemented as a specialized processing machine that includes hardware and/or software for performing the methods described herein. In addition, the processor and/or processing capabilities of information handling systems 100, 200, 300 or any portion or combination thereof. Accordingly, embodiments of the disclosure should not be construed as being limited to any particular operating environment, system architecture, or device configuration. Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time.

It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for conducting an asset and diagnostic inventory for a site location comprising:
   providing a user with a mobile interface of a computing device;
   receiving a site ID with a mobile application via the mobile interface;
   receiving an equipment ID with the mobile application via the mobile interface, wherein the equipment ID corresponds to a building equipment asset, and wherein the building equipment asset comprises heating, ventilation, and air conditioning (HVAC) equipment;
   connecting to a data repository to determine if the received equipment ID matches a stored equipment ID;
   prompting the user to enter equipment asset information into the mobile application via the mobile interface in response to the received equipment ID not matching the stored equipment ID, wherein the equipment asset information comprises one or more digital photographs of the building equipment asset and a condition description of the building equipment asset, and one or more HVAC equipment status or performance measurements performed by the user;
   associating the received equipment ID with the entered equipment asset information, and with the site ID via the mobile application;
   storing the entered equipment asset information, the received equipment ID, and the site ID in the data repository;
   retrieving equipment asset information associated with matching stored equipment ID in response to the received equipment ID matching the stored equipment ID;
   displaying equipment asset information to the user on the mobile interface;
   prompting the user to perform and enter one or more HVAC equipment status or performance measurements into the mobile application for the matching stored equipment ID, wherein the HVAC equipment performance measurements are based at least in part on an automatically drafted schematic of the HVAC equipment that indicates where to perform the one or more HVAC equipment performance measurements;
   determining whether or not the one or more HVAC equipment performance measurements is indicative of a problem with the HVAC equipment;
   generating a diagnostic report based at least in part on the HVAC equipment performance measurements performed on the HVAC equipment, wherein the diagnostic report indicates if there is a problem with the HVAC equipment;
   sending the diagnostic report to the user; and
   sending troubleshooting instructions to the user in response to the diagnostic report indicating that there is a problem with the HVAC equipment, wherein the troubleshooting instructions identify a needed repair and/or provide instructions on how to conduct the needed repair.

2. The method of claim 1 wherein equipment asset information comprises an equipment location.

3. The method of claim 1 wherein equipment asset information comprises a serial number.

4. The method of claim 1 wherein equipment asset information is collected via performing optical character recognition on an equipment label.

5. The method of claim 1 further comprising entering site asset information into the mobile application via the mobile interface.

6. The method of claim 1 wherein equipment asset information comprises a serial number and a model number.

7. A system for conducting an asset and diagnostic inventory for a site installed equipment unit comprising:
   an information handling system comprising:
   at least one memory operable to store computer-executable instructions;
   at least one communications interface to access the at least one memory; and
   at least one processor configured to access the at least one memory via the at least one communications interface and execute the computer-executable instructions to:
   provide a user with a mobile interface;
   receive an equipment ID from the user via the mobile interface, wherein the equipment ID corresponds to a building equipment asset, and wherein the building equipment asset comprises refrigeration, heating, ventilation, and air conditioning (HVAC) equipment;
   connect to a data repository to determine if the received equipment ID matches a stored equipment ID;
   prompt the user to enter equipment asset information into the mobile application via the mobile interface in response to the received equipment ID not matching the stored equipment ID, wherein the equipment asset information comprises one or more digital photographs of the building equipment asset, a condition description of the building equipment asset, and one or more HVAC equipment status or performance measurements performed by the user;
   associate the received equipment ID with the entered equipment asset information;
   store the entered equipment asset information, the received equipment ID, and the site ID in the data repository;
   retrieve equipment asset information associated with matching stored equipment ID in response to the received equipment ID matching the stored equipment ID;
   display equipment asset information to the user on the mobile interface;
   prompt the user to perform and enter one or more HVAC equipment status or performance measurements into the mobile application for the matching stored equipment ID, wherein the HVAC equipment performance measurements are based at least in part on an automatically drafted schematic of the HVAC equipment that indicates where to perform the one or more HVAC equipment performance measurements;
   determine whether or not the one or more HVAC equipment performance measurements is indicative of a problem with the HVAC equipment;
   generate a diagnostic report based at least in part on the HVAC equipment performance measurements performed on the HVAC equipment, wherein the diagnostic report indicates if there is a problem with the HVAC equipment;
   send the diagnostic report to the user; and
   send troubleshooting instructions to the user in response to the diagnostic report indicating that there is a problem with the HVAC equipment, wherein the troubleshooting instructions identify a needed repair and/or provide instructions on how to conduct the needed repair.

8. The system of claim 7 further comprising an instruction to send a diagnostic report to the user if a determination is made that there is not a problem with the HVAC equipment.

9. The system of claim 7, wherein the diagnostic report indicates needed repair services for the HVAC equipment.

10. The system of claim 7 further comprising an instruction to store the one or more HVAC equipment performance measurements on one or more tangible, non-volatile computer-readable media thereby creating a building asset information product.

11. The system of claim 7 further comprising an instruction to associate the one or more HVAC equipment performance measurements with a site ID corresponding to the location where the one or more HVAC equipment performance measurements are taken.

12. The system of claim 7 further comprising an instruction to store the diagnostic report.

13. The system of claim 7 further comprising an instruction to apply one or more rulesets to the one or more HVAC equipment performance measurements and provide service instructions to the user.

14. The system of claim 7, wherein the HVAC equipment comprises an HVAC roof top unit.

15. The system of claim 7, wherein the one or more building equipment asset measurements comprise a dry bulb temperature measurement taken above a roofline between a filter and an evaporator of the HVAC equipment.

16. The system of claim 7, wherein the one or more building equipment asset measurements comprise a dry bulb temperature measurement taken above a roofline and proximate an outdoor fan of the HVAC equipment.

17. The system of claim 7, wherein the one or more building equipment asset measurements comprise a dry bulb temperature measurement taken above a roofline and proximate an outside air intake of the HVAC equipment.

18. The system of claim 7, wherein the one or more building equipment asset measurements comprise a dry bulb temperature measurement taken in a return air duct of the HVAC equipment disposed below a roofline.

19. The system of claim 7, wherein the one or more building equipment asset measurements comprise a dry bulb temperature measurement taken in a supply air duct of the HVAC equipment disposed below a roofline.

20. The system of claim 7, wherein the one or more building equipment asset measurements comprise a plurality of equipment measurements taken at an HVAC equipment, wherein the troubleshooting instructions are configured to instruct the user to take the plurality of building equipment asset measurements, and wherein the troubleshooting instructions instruct the user to take liquid line temperature measurement of the HVAC equipment after taking other building equipment asset measurements, wherein the liquid line temperature measurement comprises the user connecting to a closed refrigerant circuit of the HVAC equipment.

* * * * *